United States Patent
Soufiane

(10) Patent No.: US 6,636,675 B2
(45) Date of Patent: Oct. 21, 2003

(54) OPTICAL FIBER WITH REDUCED CLADDING-MODE LOSS

(75) Inventor: Abdelouahed Soufiane, Boston, MA (US)

(73) Assignee: Verrillon, Inc., North Grafton, MA (US)

(*) Notice: Subject to any disclaimer, the term of this patent is extended or adjusted under 35 U.S.C. 154(b) by 0 days.

(21) Appl. No.: 09/922,544

(22) Filed: Aug. 3, 2001

(65) Prior Publication Data

US 2002/0126971 A1 Sep. 12, 2002

Related U.S. Application Data

(60) Provisional application No. 60/275,057, filed on Mar. 12, 2001.

(51) Int. Cl.$^7$ ............................................. G02B 6/16
(52) U.S. Cl. ......................................................... 385/123
(58) Field of Search .......................... 385/123, 37, 31, 385/15, 127, 14, 24, 45; 372/6, 102; 359/127, 130, 337, 341

(56) References Cited

U.S. PATENT DOCUMENTS

| | | | |
|---|---|---|---|
| 3,785,718 A | 1/1974 | Gloge | 350/96 WG |
| 3,997,241 A | 12/1976 | Nishida et al. | 350/96 WG |
| 4,341,441 A | 7/1982 | Lighty et al. | 350/96.3 |
| 4,549,891 A | 10/1985 | Plummer | 65/3.12 |
| 4,551,162 A | 11/1985 | Hicks, Jr. | 65/4.2 |
| 4,557,742 A | 12/1985 | Thigpen | 65/2 |
| 4,579,571 A | 4/1986 | Hicks, Jr. | 65/3.12 |
| 4,630,889 A | 12/1986 | Hicks, Jr. | 350/96.3 |
| 4,634,218 A | 1/1987 | Hicks, Jr. | 350/96.3 |
| 4,680,767 A | 7/1987 | Hakimi et al. | 372/6 |
| 4,681,399 A | 7/1987 | Hicks, Jr. | 350/96.3 |
| 4,682,994 A | 7/1987 | Mansfield | 65/3.12 |
| 4,712,075 A | 12/1987 | Snitzer | 330/4.3 |
| 4,715,672 A | 12/1987 | Duguay et al. | 350/96.12 |
| 4,749,396 A | 6/1988 | Hicks, Jr. | 65/3.12 |
| 4,780,877 A | 10/1988 | Snitzer | 372/6 |
| 4,782,491 A | 11/1988 | Snitzer | 372/6 |
| 4,815,079 A | 3/1989 | Snitzer et al. | 372/6 |
| 4,822,136 A | 4/1989 | Hicks, Jr. | 350/96.34 |
| 4,826,288 A | 5/1989 | Mansfield et al. | 350/320 |
| 4,848,998 A | 7/1989 | Snitzer et al. | 65/3.11 |
| 4,852,117 A | 7/1989 | Po | 372/97 |
| 4,863,501 A | 9/1989 | Mansfield | 65/3.11 |
| 4,877,306 A | 10/1989 | Kar | 350/96.33 |
| 5,246,734 A | 9/1993 | Varaprath et al. | 427/166 |
| 5,373,576 A | 12/1994 | Minns et al. | 385/125 |
| 5,418,880 A | 5/1995 | Lewis et al. | 385/123 |
| 5,484,822 A | 1/1996 | Minns | 522/35 |
| 5,492,987 A | 2/1996 | Minns | 526/245 |
| 5,533,163 A | 7/1996 | Muendel | 385/126 |
| 5,534,558 A | 7/1996 | Minns | 522/35 |
| 5,570,440 A | 10/1996 | Mizrahi | |
| 5,572,618 A | 11/1996 | DiGiovanni et al. | 385/140 |
| 5,579,429 A | 11/1996 | Naum | 385/143 |
| 5,898,715 A * | 4/1999 | LeGrange | 372/6 |
| 6,181,465 B1 | 1/2001 | Grubb et al. | |
| 6,445,851 B1 * | 9/2002 | Rakujic et al. | 385/37 |

FOREIGN PATENT DOCUMENTS

| | | |
|---|---|---|
| EP | 0 310 293 A | 4/1989 |
| EP | 0 774 679 A | 5/1997 |
| GB | 2 239 983 A | 7/1991 |

OTHER PUBLICATIONS

Dong et al. "Optical Fibers with Depressed Claddings for Suppression of Coupling into Cladding Models in Fiber Bragg Gratings," *IEEE Photonics Technology Letters*, vol. 9, No. 1, Jan. 1997, pp. 64–66.

* cited by examiner

*Primary Examiner*—Jean F. Duverne
(74) *Attorney, Agent, or Firm*—Testa, Hurwitz & Thibeault, LLP

(57) ABSTRACT

The invention is directed toward an optical fiber that reduces the cladding mode coupling loss (CMCL) therein. The fiber includes a core, a cladding concentrically surrounding the core, and at least one lossy region concentrically surrounding the core. The lossy region is disposed within the cladding and is slightly displaced radially from the core.

22 Claims, 2 Drawing Sheets

OPTICAL FIBER WITH REDUCED CLADDING-MODE LOSS

CROSS-REFERENCE TO RELATED APPLICATIONS

This application claims the benefits of U.S. Provisional Patent Application No. 60/275,057, filed on Mar. 12, 2001, the entire disclosure of which is hereby incorporated by reference.

FIELD OF THE INVENTION

The invention relates generally to optical fibers and more specifically to optical fibers with reduced cladding-mode losses.

BACKGROUND OF THE INVENTION

Fiber Bragg gratings are used in various wavelength-dependent signal-processing applications, most notably in wavelength-division multiplexing (WDM) and dense wavelength-division multiplexing (DWDM) systems. In these systems, light of multiple wavelengths propagates through a transmission medium, typically an optical fiber. Because the wavelengths are spaced apart spectrally and do not interfere with each other, they represent separate communication channels that can be independently modulated to carry information. To select a particular channel, its wavelength must be extracted (i.e., demultiplexed) from the multiple-wavelength signal.

Fiber Bragg gratings are used to filter, reflect and/or demultiplex WDM signals. The grating is essentially the opposite of a bandpass filter, efficiently reflecting light within a narrow spectral band; as a result, the reflected band may be routed to another part of the system and/or analyzed to recover information encoded therein, or not used at all. A series of gratings may be used to extract multiple wavelengths from a signal for separate analysis or rerouting, or to confine the propagating signal to a single channel. The fiber Bragg grating is contained within an optical fiber, eliminating the need for separate bulk optical filter devices that add cost and complexity.

When the forward-propagating core and cladding modes reach the fiber Bragg grating, light at the Bragg wavelength is reflected along with some of the cladding modes (i.e., light propagating in the cladding of the fiber). The backward-propagating cladding modes couple with the forward-propagating core modes resulting in cladding-mode coupling loss (CMCL). CMCL degrades the performance of the Bragg grating, and thus the performance of the overall system.

SUMMARY OF THE INVENTION

The present invention is directed toward attenuating the power propagating in the cladding of an optical fiber, thereby reducing the amount of coupling between the cladding mode power reflected at the Bragg grating interface with the forward propagating core modes. In other words, the cladding-mode coupling loss is reduced.

Accordingly, in one aspect, the invention relates to a method of attenuating the cladding modes in an optical fiber in conjunction with a fiber Bragg grating. The method includes the step of providing an optical fiber having a core configured to transmit radiation to a fiber Bragg grating, a cladding surrounding the core, and within the cladding, an annular region of lossy material concentric with the core. Additionally, the method includes the step of propagating radiation through the core. The radiation consists of a core mode propagating through the core and a cladding mode propagating through the cladding near the core. The lossy region attenuates the cladding mode without substantially affecting the core mode, thereby reducing the attenuation of the core mode as a result of coupling with the cladding mode.

In one embodiment, the annular region of lossy material is slightly displaced radially from the core. The lossy material may be a titanium compound (e.g., titanium oxide) and/or rich in $Ti^{3+}$. A portion of the core may define the fiber Bragg grating.

Another aspect of the present invention is directed to a fiber adapted to selectively affect at least one wavelength from a radiation signal propagating through the fiber. The fiber includes a core, a cladding, and a lossy region within the cladding. The core receives radiation, which propagates to a fiber Bragg grating. The fiber Bragg grating may be defined within the core and selectively affects at least one wavelength. The cladding surrounds the core as does the lossy region, which is annular in shape. Radiation propagating in the core consists of a core mode propagating through the core and a cladding mode propagating through the cladding near the core. The lossy region attenuates the cladding mode without substantially affecting the core mode, thereby limiting loss of the core mode as a result of coupling with the cladding mode.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Figure 1:
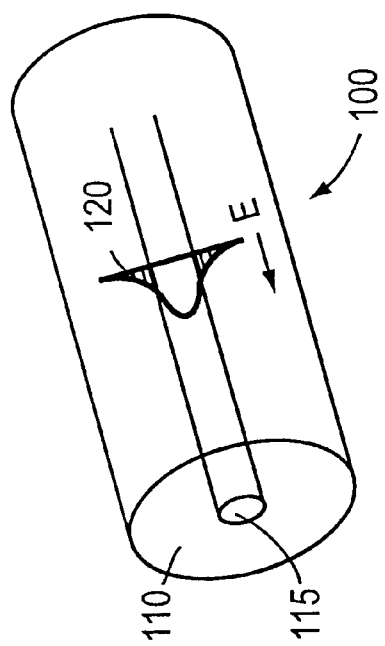
FIG. 1 is a perspective view an optical fiber showing the radial power profile of light propagating through a representative fiber.

In most light-carrying optical fibers, there exists an interface between the core and the surrounding medium, typically a glass cladding. This structure supports a number of cladding modes (i.e., signal power that propagates through the cladding) as well as the core mode, which propagates through the fiber core. With reference to FIG. 1, a typical optical fiber 100 includes a cladding 110 surrounding a core 115. FIG. 1 depicts the energy profile of a single-mode beam, having a gaussian energy distribution, propagating through core 115. Although the bulk of the propagating signal power remains within the core, a portion, the "tail" 120, extends radially out of the core and propagates within the cladding 110. Although the gaussian profile is asymptotic, tail 120 is considered effectively to extend to mode field diameter—i.e., the point at which the power level becomes negligible (less than the noise level).

Figure 2:
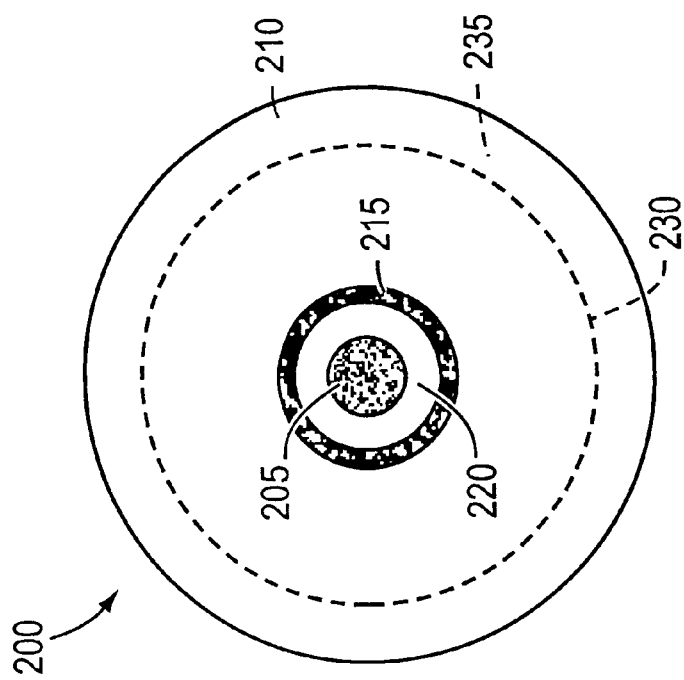
FIG. 2 is a cross-sectional view of an embodiment of the present invention.

With reference to FIG. 2, an optical fiber 200 in accordance with the present invention includes a core 205, a cladding 210, an annular region of lossy material 215 that is preferably displaced radially from and concentric with core 205, and a thin annular cladding region 220 between core 205 and annular lossy material 215. Typically, cladding 210 and thin annular cladding region 220 are composed of silica-based glass material(s). The function of the lossy material 215 is to absorb energy and thereby attenuate the cladding mode. Ideally, lossy material 215 would directly surround core 205 and capture the entire tail 120 (FIG. 1). In such a configuration, however, lossy material 215 would in fact absorb energy from the core mode as well, thereby attenuating the signal. Accordingly, annular cladding region 220 serves to separate lossy material 215 from core 205 in order to prevent or at least limit signal attenuation.

In one embodiment, lossy material 215 is a glass composition containing titanium oxide, although other compounds containing transition metals (e.g., oxides of iron, nickel, copper, cobalt, etc.) can be used to produce the desired performance. In a preferred embodiment, at least a portion of the titanium is in the $Ti^{3+}$ oxidation state, although different or mixed oxidation states of titanium can be used instead or in addition. $Ti^{3+}$ is advantageous because of its strong absorption in the telecommunication spectral region (i.e., 800–1700 nm). Separating core 205 and lossy material 215 is annular cladding region 220, which is typically a layer of cladding 210, although other materials can be used to produce specific performance characteristics. The thicknesses of annular cladding region 220 and lossy material 215 are important to the proper operation of the invention. In one embodiment, lossy material 215 occupies as much of the region defined by tail region 120 (see FIG. 1) as possible. Accordingly, lossy material 215 should be thick enough to capture the entire radial extent of tail 120, and be disposed sufficiently close to core 205 to adequately attenuate the cladding modes without noticeably affecting the core mode. In other words, annular cladding region 220 should be as thin as possible consistent with its function attenuating the cladding mode. Typically, the radial extent of annular cladding region 220 is less, and frequently substantially less, than the radius of core 205. In one exemplary embodiment, core 205 is approximately 8 µm in diameter, annular region 220 has a thickness of about 10 µm, and lossy region 215 has an outer diameter equal to or greater than the mode field diameter of the fiber at the operating wavelength. As will be appreciated by those of skill in the art, the appropriate dimensions of annular region 220 and lossy region 215 depend, for particular applications, on the index profile of the fiber.

In operation, light propagates through core 205, and as previously stated, some of the light propagates outside core 205. Although a portion of the cladding-mode tail region 120 can propagate through annular cladding region 220, the bulk of the cladding mode is captured and eliminated by lossy material 215. Consequently, most of the are attenuated by lossy material 215, thereby reducing the CMCL.

Figure 3:
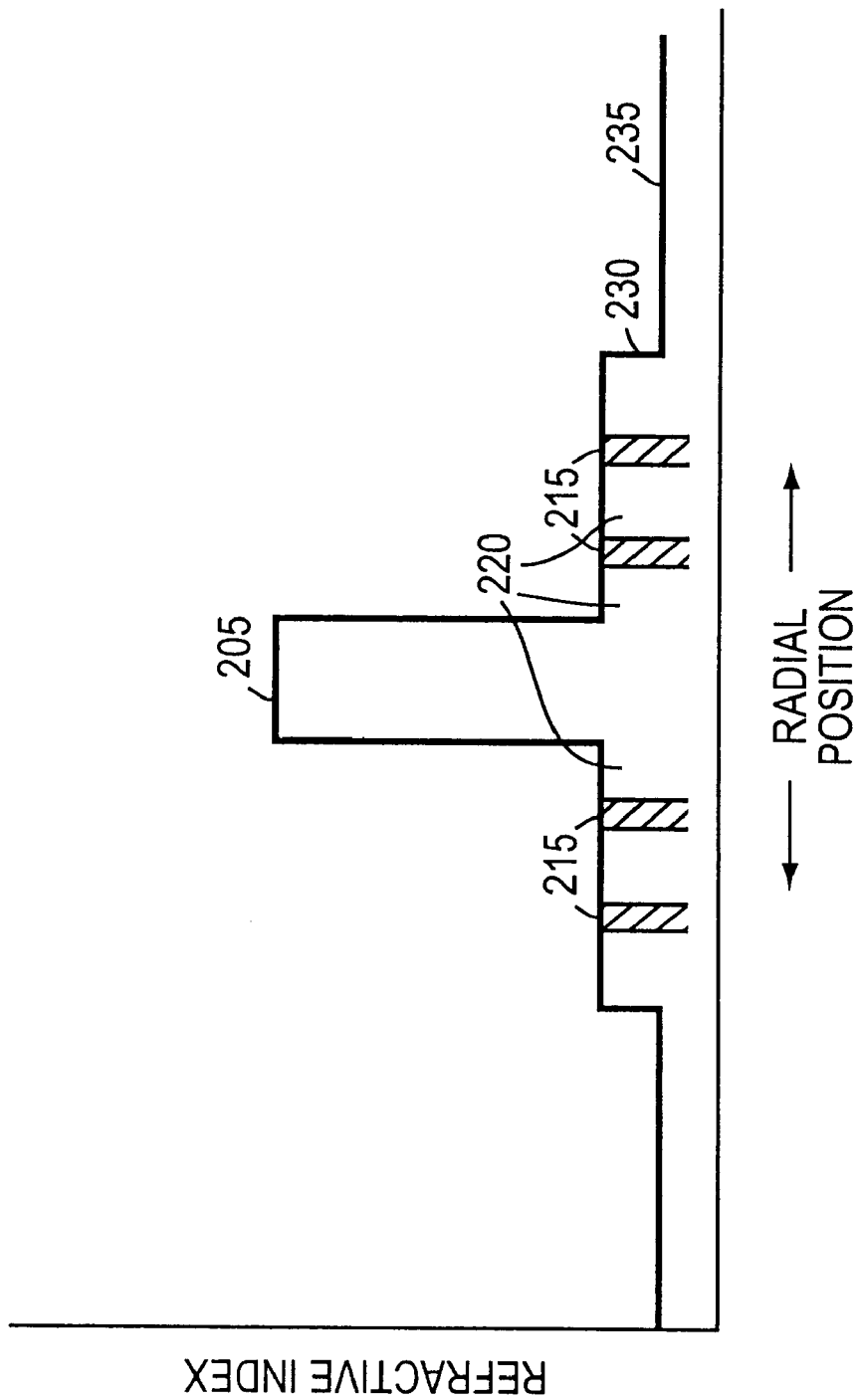
FIG. 3 depicts the radial variation in refractive index of a fiber having multiple lossy segments within a cladding region having a refractive index greater than that of a surrounding cladding region.

It is possible, as shown in FIG. 3, to have two or more concentric lossy regions 215, each spaced from its inner neighbor by an annular cladding region 220. In general, the thickness of the annular cladding regions 220 is desirably equal to or less than the operating wavelength, so that tail energy is not lost as a result of these intervening regions.

Also, as shown in FIGS. 2 and 3, it is also possible to utilize a cladding whose refractive index varies radially, i.e., is slightly higher in the immediate proximity of the core. As described in copending application Ser. No. 60/305,916, entitled OPTICAL FIBER WITH A RADIALLY VARYING INDEX OF REFRACTION AND RELATED METHODS and filed on Jul. 17, 2001(the entire disclosure of which is hereby incorporated by reference), this configuration improves the coupling efficiency of both cladding-fused and core-fused optical couplers (i.e., limiting coupling loss and insertion loss) as well as other fused devices such as add-drop filters and multiplexers. The thickness of primary cladding 230 is generally less than that of secondary cladding 235, but the one or more regions 215 of lossy material will ordinarily be contained within the primary cladding 230. The difference in refractive indices among core 205, primary cladding 230 and secondary cladding 235 (i.e., $n_{core} > n_{primary\ cladding} > n_{secondary\ cladding}$) is straightforwardly obtained, e.g., through differential doping. The difference in refractive index between primary cladding 230 and secondary cladding 235 (i.e., $n_{primary\ cladding} - n_{secondary\ cladding}$) generally remains in a range between a constant and the core refractive index less the constant (i.e., between a constant k and $n_{core}-k$). In one embodiment the constant is 0.0002. The refractive indices are determined before fabrication and may be selected to provide the desired performance for a given wavelength of light and coupling application.

It is also possible to make the core (and, possibly, cladding layer or layers) photosensitive to facilitate production of fiber Bragg gratings, which are typically implemented by modulating the refractive index of the fiber core. These devices, which are used to filter, reflect and/or demultiplex wavelength-division multiplexed signals, are implemented within the fiber itself by providing a refractive-index modulation within the core. These gratings may be obtained by rendering the core photosensitive to a certain form of radiation (typically ultraviolet light) and then exposing the fiber to such radiation, thereby altering the refractive index of the core where so exposed. Photosensitivity may be achieved, for example, by doping a silica core with germanium and boron. To create the pattern of index variations characteristic of a fiber Bragg grating, the fiber may be exposed to the radiation through a phase mask or holographically.

Fibers in accordance with the present invention can be manufactured using techniques well know in the art, such as modified chemical vapor deposition (MCVD), chemical vapor deposition (CVD), or outside vapor deposition (OVD), although many other well-characterized techniques can also be used.

Having shown the preferred embodiments, one skilled in the art will realize that many variations are possible within the scope and spirit of the claimed invention. It is therefore the intention to limit the invention only by the scope of the claims.

What is claimed is:

1. A method of suppressing cladding-mode loss in an optical fiber in conjunction with a fiber Bragg grating, the method comprising the steps of:

a. providing a fiber including (i) a core configured to transmit radiation to a fiber Bragg grating, (ii) a cladding surrounding the core, and (iii) within the cladding, at least one annular region of a lossy material concentric with the core; and b. propagating radiation through the core, the radiation producing a core mode propagating through the core and a cladding mode propagating through the cladding near the core, the lossy region attenuating the cladding mode without substantially affecting the core mode.

2. The method of claim 1 wherein the at least one annular region of lossy material is slightly displaced radially from the core.

3. The method of claim 2 wherein the fiber is configured to transmit light having a wavelength and comprises a plurailty of annular regions of lossy material separated by a spacing having a dimension no greater than the wavelength.

4. The method of claim 1 wherein the lossy material is a compound containing a transition metal.

5. The method of claim 3 wherein the lossy material is titanium oxide.

6. The method of claim 5 herein the lossy material is rich in $Ti^{3+}$.

7. The method of claim 1 wherein a portion of the core defines the fiber Bragg grating.

8. The method of claim 1 wherein the core comprises a photosensitive material facilitating creation of a fiber Bragg grating within the fiber.

9. The method of claim 1 wherein the cladding comprises an inner region having a first refractive index and an outer region having a second refractive index, the first refractive index being greater than the second refractive index, the at least one annular lossy region being disposed within the inner region.

10. The method of claim 9 wherein the core has a refractive index, the first and second refractive indices differing by an amount between (i) a constant and (ii) the core refractive index less the constant.

11. The method of claim 10 wherein the constant is 0.0002.

12. A fiber adapted to selectively affect at least one wavelength from a radiation signal propagating therethrough, the fiber comprising:

a. a core including a fiber Bragg grating or means facilitating creation of a fiber Bragg grating, the grating selectively affecting the at least one wavelength;

b. a cladding surrounding the core; and c. within the cladding, at least one annular region of a lossy material concentric with the core, wherein radiation propagating through the core has a core mode propagating through the core and a cladding mode propagating through the cladding near the core, the lossy region being configured to attenuate the cladding mode without substantially affecting the core mode.

13. The fiber of claim 12 wherein the annular region of lossy material is slightly displaced radially from the core.

14. The fiber of claim 13 wherein the fiber is configured to transmit light having a wavelength and comprises a plurality of annular regions of lossy material separated by a spacing having a dimension no greater than the wavelength.

15. The fiber of claim 12 wherein the lossy material is a compound containing a transition metal.

16. The fiber of claim 15 wherein the lossy material is titanium oxide.

17. The fiber of claim 16 herein the lossy material is rich in $Ti^{3+}$.

18. The fiber of claim 12 wherein a portion of the core defines the fiber Bragg grating.

19. The fiber of claim 12 wherein the core comprises a photosensitive material facilitating creation of a fiber Bragg grating within the fiber.

20. The fiber of claim 12 wherein the cladding comprises an inner region having a first refractive index and an outer region having a second refractive index, the first refractive index being greater than the second refractive index, the at least one annular lossy region being disposed within the inner region.

21. The fiber of claim 20 wherein the core has a refractive index, the first and second refractive indices differing by an amount between (i) a constant and (ii) the core refractive index less the constant.

22. The fiber of claim 21 wherein the constant is 0.0002.

* * * * *